April 23, 1963     R. L. GUNNELL     3,086,826

BEARING CONSTRUCTION

Filed Nov. 30, 1959

INVENTOR
ROBERT L. GUNNELL

BY *Price and Heneveld*

ATTORNEYS

United States Patent Office 3,086,826
Patented Apr. 23, 1963

3,086,826
BEARING CONSTRUCTION
Robert L. Gunnell, Grand Rapids, Mich., assignor to The
Rapids-Standard Company, Inc., Grand Rapids, Mich.,
a corporation of Michigan
Filed Nov. 30, 1959, Ser. No. 856,123
1 Claim. (Cl. 308—37)

This invention relates to a bearing structure, and more particularly to a bearing structure which requires little or no lubrication.

Conveyors are often used in the handling and processing of food. Conveyors used for this purpose are usually roller type conveyors which require some type of bearing at either end of the roller to support the roller and allow it to rotate freely. Previously, bearings such as roller bearings, ball bearings and sleeve type bearings have been used for this purpose. The ball and roller bearings are usually made of some type of high grade steel, and the sleeve bearings of some form of bronze alloy or tough plastic, all of which require some form of lubrication, at least when subjected to heavy-duty commercial uses. Oftentimes, these types of bearings are over-lubricated, and the lubricant will escape from the bearings and drop or come in contact with the foodstuff moving on the conveyor. This renders the foodstuff unfit for consumption, and the food processor must suffer an unwarranted loss. The above-mentioned bearing leak may be prevented by seals; however, seals to prevent the escape of lubricant from such bearings are costly and prohibitive in a competitive market.

The major problem in the food industry, however, is the necessity of constant cleaning. In the past, the inability of unsealed bearings to resist corrosion and loss of lubricant due to water and detergents has effectively prevented high-efficiency conveyors from being used in heavy-duty food-handling applications, where frequent washing of the conveyor is necessary. The present invention solves this problem by providing a bearing which is impervious to water, detergents, and many corrosive chemicals.

At the same time, the bearing of this invention is noiseless as compared to all-metal bearings, and since it does not require hardened raceways, it can be constructed entirely of light-weight, noncorroding soft metals such as aluminum.

Therefore, it is an object of this invention to provide a light-weight, self-lubricating bearing which is economical to manufacture, and which is impervious to corrosion.

It is a further object to provide a bearing assembly wherein the bearing member is composed of a synthetic resin.

It is still another object to provide a bearing member which has lubricious surface characteristics requiring no additional lubrication.

Another object is to provide a plastic bearing which will withstand the weight imposed thereupon without appreciable creep.

A further object is to provide a bearing member having limited elasticity to provide for ease of assembly on a bearing race.

It is still another object to provide a bearing assembly which is of simple construction, consisting of a minimum number of parts.

These and other objects and advantages in the practice of this invention will be more apparent in the illustration and description of the working embodiment of this invention, as hereinafter set forth.

Figure 1:
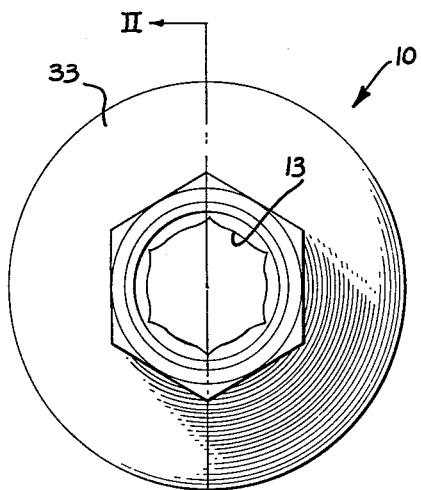
FIG. 1 is an end elevational view of the bearing assembly.
Figure 4:
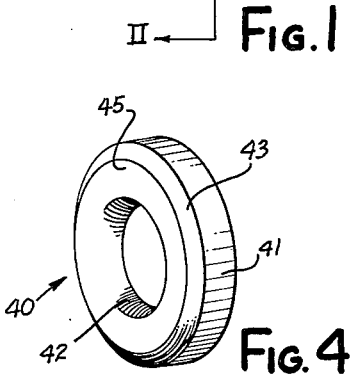
FIG. 4 is a perspective view of the bearing member per se.
Figure 3:
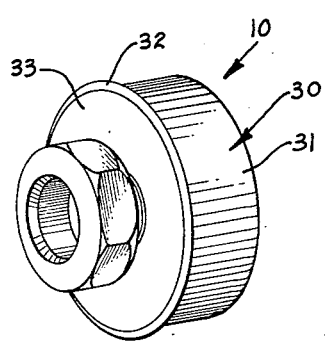
FIG. 3 is a perspective view of the bearing assembly.

Referring now specifically to the drawings, the bearing assembly shown therein is designated generally by the numeral 10.

The bearing assembly 10 is composed of several components including a cone 11 having an inner race 12, a bearing member or ring 40, an outer race 20, a race housing clamp or bearing shell 30, and a bearing retaining ring 25. The races 12 and 20 must be carefully smoothed to reduce their sliding friction coefficient.

Figure 2:
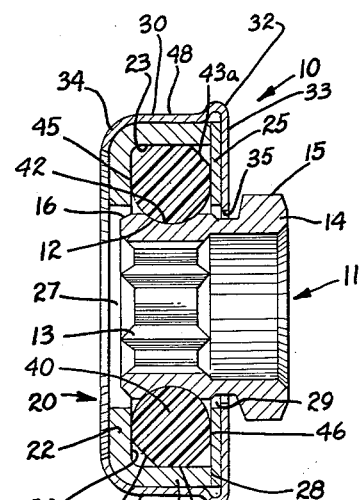
FIG. 2 is a cross sectional view of the bearing assembly taken along the plane II—II of FIG. 1.
Figure 5:
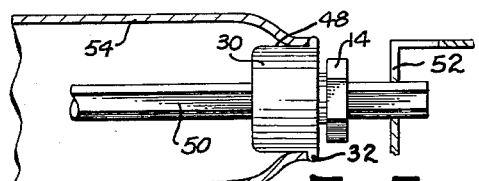
FIG. 5 is a side view, partly in section, of the bearing assembled in a conveyor roller.

The inner race 12 is best shown in FIG. 2. The inner periphery 13 of the inner race 12 is hexagonal-shaped and receives a hexagonal support shaft 50 (FIG. 5). The cone 11 is effectively keyed to the support shaft 50 by the hexagonal surface 13.

The cone 11 has a sleeve 14 which is integral therewith and extends beyond the race housing clamp 30. The inner periphery of the sleeve 14 is of a larger diameter than the support shaft 50 so as not to interfere therewith. The outer surface of the sleeve 14 is a cold drawn hexagonal shape forming a nut 15. A wrench may be applied to the nut 15 to position the support shaft 50 with respect to the aperture in the outer conveyor support tracks 52 (FIG. 5) in which the support shaft 50 is held.

The outer periphery of the inner race is formed into the inner race bearing surface 12 by machining a groove therein. The inner race bearing surface 12 is circular in shape and forms an arc of about ninety degrees in cross section as shown in FIG. 2. It is in effect a circular groove about the outer periphery of the cone 11. The bearing member 40, now to be described, rides on the inner race bearing surfaces 12.

The edges of the cone 11 is chamfered at 16 for purposes which will be explained in detail hereinafter.

The bearing member 40 is of a generally doughnut or O-ring shape. It is made of a thermoplastic synthetic resin having a low coefficient of friction (about 0.2 in the preferred embodiment), high abrasion resistance, high stiffness, low water absorption, high dimensional stability (creep resistance), and at least partial elasticity when heated below the melting point. A material satisfying these requirements is sold under the trademark "Delrin," Type 500X, by E. I. du Pont de Nemours & Co., Wilmington 98, Delaware.

Looking at a cross section of the bearing 40 as shown in FIG. 2, the inner race engaging surface 42 of the bearing member is circular so as to correspond substantially to the bearing surface 12 of the inner race. The outer periphery of the bearing 40 is flattened throughout the circumference thereof to provide an outer race engaging or bearing surface 41. A portion of the generally circular shaped bearing is removed from either side of the bearing surface 41 about the circumference thereof to form conical surfaces or flats 43 and 43a. These areas of the bearing are removed to prevent the outer bearing surface from binding on the outer race 20 and to reduce the area of friction. Continuous binding of the bearing on the outer race could eventually cause the bearing assembly to lock up, and thereby render the bearing inoperative. The outer bearing surface 41 of bearing member 40 engages and supports outer race 20 now to be described.

The outer race 20 is generally cup shaped having a retaining side 22 and a bearing rim 21. A substantial portion of the outer race retaining side is removed, forming an aperture 27, to allow the support shaft 50 to pass through the bearing assembly and engage the conveyor support track 52. The outer race 20 partially surrounds the bearing member 40 and has a bearing surface 23 around the inner periphery of the bearing rim 21. The outer race retaining side 22 has a surface 24 which engages the bearing member 40 along plane 45 of the bearing, and acts as a means for retaining the bearing with the bearing assembly. It can be seen in FIG. 2 that the conical surface 43 of the bearing member is necessary to prevent the bearing binding at the juncture point of the outer race bearing surface 23 and side 24. The outer race bearing rim 21 has an edge 28 which extends around the circumference thereof. The edge 28 is flat and generally parallel to the outer race retaining side 22.

A retaining ring or washer 25 which is of the same diameter as outer race 20 is secured at its outer periphery to the edge 28. The washer 25 has an aperture 29 which allows the inner race to pass therethrough. The aperture 29 of washer 25 is the same diameter as the aperture 27 in the outer race retaining side 22. The retaining washer 25 engages the bearing member 40 along plane 46 thereof and retains the bearing within the bearing assembly 10. The conical surface 43a is necessary to prevent binding between the bearing 40 and the juncture area of outer race bearing surface 23 and the inner face of washer 25.

It is now apparent that the bearing member 40 slides on the inner race bearing surface 12 and the outer race bearing surface 23 rides on the bearing surface 41 of bearing member 40. The outer race retaining side 22 and retaining washer 25 retain the bearing 40 in axial position with respect to the inner race of cone 11.

The retaining washer 25 is held in place against the outer race edge 28 by a race housing clamp or shell identified generally as 30. The housing clamp or shell 30 is also generally cup-shaped, having a side wall 33 and a flange or rim 31. An aperture 35 is formed in the side wall of housing clamp 30, and is of sufficient dimension so as to allow the inner race of cone 11 to pass therethrough. Sufficient space is provided between the edges of apertures 29 and 35 and the cone 11 so that they will not touch if the cone 11 becomes slightly misaligned due to wear of the bearing member 40. The housing 30 has a crimp 32 at the juncture point of the flange or rim 31 and side wall 33. The upper edge of the rim 31 is turned in to form a lip 34. The lip 34 is designed so as to follow the contour of outer race 20. The clamp flange or rim 31 lies adjacent the outer periphery of bearing rim 21, and the lip 34 extends beyond the outer race bearing rim 21 and partially along the outer race retaining side 22.

The lip 34, when crimped into place, holds the bearing together. The crimp 32 acts as a flange to keep the bearing from being pushed into the roller (see FIG. 5).

*Alternative Embodiment*

Figure 6:
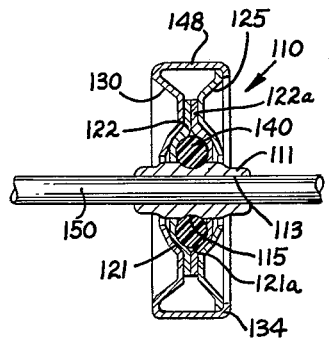
FIG. 6 is a vertical section of an alternative embodiment of the invention.

The above-described embodiment is designed as a bearing for conveyor rollers. Another embodiment designed for use as an idler wheel is shown in FIG. 6. In this embodiment, a ring 140 having a circular cross-section is fitted onto a race 115 of a cone 111. The interior surface 113 of the bore of cone 111 is circular in cross-section to accommodate an idler wheel shaft 150. The outer race consists of a pair of dish-like washers 121, 121a whose flanges 122, 122a are held together by retainer washer 125 and housing clamp or shell 130. The assembly is locked together by a peened-over lip 134 of housing clamp 130. Surface 148 of housing clamp 130 is the load-bearing surface of the idler wheel 110.

*Operation*

The bearing construction such as 10 or 110 is operative to eliminate friction between a stationary and rotating member or two rotating members. The inner race cone 11 is normally keyed to a shaft 50 supported by a side rail 52, or to some other supporting member, by the hexagonal surface 13. The bearing 10 is disposed within a rotatable member such as a pulley or a conveyor roller 54 which fits onto the outer surface 48 of the housing clamp or bearing shell 30. So mounted, the bearing member 40 acts as a means of reducing friction between the member carried by the outer race and the member secured to the inner race.

The physical properties of the bearing member 40 allow a bearing construction such as 10 or 110 to be used in conveying food stuff or other articles that are subject to contamination, or which require frequent washing of the conveyor, without fear of oil dropping from the bearing and damaging these articles and without fear of the bearings rusting out or losing their lubricant under the action of a washing detergent.

Although the bearing construction 10 or 110 may be used without oil or grease being added to the bearing member, it is sometimes desirable that a small amount of lubricant be placed thereon. When lubricant is placed on this type of bearing, only a very small amount is necessary and as a general rule the bearing need be lubricated only once or twice during the life of the bearing. Therefore, even if the bearing of this type were lubricated there would be very little chance of the lubricant being discharged from the bearing construction and contaminating articles being conveyed.

It should be apparent from the disclosure here in that applicant has invented a bearing which consists of few parts and is simple and easy to manufacture. The bearing is silent, washable and can be used with no lubricant or very little lubricant due to the lubricious characteristic of its surface. Such a bearing construction is ideal for use in a situation where a sanitation problem exists.

While applicant has described a preferred embodiment of this invention it is to be understood that various modifications of this invention may be made. Each of these modifications which embodies the principles of this invention is to be considered as included in the following appended claim unless this claim by its language expressly states otherwise.

I claim:

In a conveyor rolling element, a load supporting, self-lubricating, quietly operating, corrosion resistant, lightweight, readily assembled, bearing construction comprising: a one piece inner race hub of a corrosion resistant material having an annular groove in its radially outer peripheral surface forming a raceway; an O-shaped, one-piece, synthetic resin, bearing ring in said groove, the inner diameter of said ring being less than the greatest diameter of said hub; the synthetic resin of said ring having sufficient elasticity when heated to enable the ring to be expanded and snapped into the annular groove on the outer periphery of said inner race hub; said synthetic resin ring normally having lubricious surface characteristics with a low coefficient of friction, a high resistance to abrasion, a high dimensional stability, high stiffness, and a low water absorption; and outer race means of a corrosion resistant material, said outer race means having in its radially inner periphery an annular raceway fitting over the radially outer surface portions of said ring.

References Cited in the file of this patent

UNITED STATES PATENTS

| | | |
|---|---|---|
| 677,429 | Sturges | July 2, 1901 |
| 743,843 | Elliott | Nov. 10, 1903 |
| 1,500,516 | Morton | July 8, 1924 |
| 1,776,412 | Bresien | Sept. 23, 1930 |
| 2,609,256 | Baker | Sept. 2, 1952 |
| 2,704,230 | Roschlau | Mar. 15, 1955 |
| 2,768,725 | Foulds et al. | Oct. 30, 1956 |
| 2,865,692 | Gossmann | Dec. 23, 1958 |

OTHER REFERENCES

Product Engineering, July 1950, pages 102 and 107 relied upon.

"Delrin," publication by E. I. du Pont de Nemours & Co., Wilmington, Delaware. Pages 41 and 100–107 relied upon.